United States Patent [19]
Kuribara et al.

[11] Patent Number: 5,249,431
[45] Date of Patent: Oct. 5, 1993

[54] RESIDUAL COOLANT SENSOR FOR AIR CONDITIONING SYSTEM

[75] Inventors: Masaru Kuribara; Kazumitsu Kobayashi, both of Isesaki, Japan

[73] Assignee: Japan Electronic Control Systems Co., Ltd., Gunma, Japan

[21] Appl. No.: 834,281

[22] PCT Filed: Jun. 26, 1991

[86] PCT No.: PCT/JP91/00855
  § 371 Date: Feb. 5, 1992
  § 102(e) Date: Feb. 5, 1992

[51] Int. Cl.$^5$ ............................................. F25B 49/02
[52] U.S. Cl. .................................... 62/129; 374/148
[58] Field of Search ............... 62/125, 126, 127, 129; 374/147, 148

[56] References Cited

U.S. PATENT DOCUMENTS

| | | | |
|---|---|---|---|
| 2,165,569 | 7/1939 | Obermaier | 62/129 |
| 3,059,443 | 10/1962 | Garner | 62/129 X |
| 3,113,458 | 12/1963 | Kimbell et al. | 374/148 X |
| 4,167,858 | 9/1979 | Kojima et al. | 62/129 X |

FOREIGN PATENT DOCUMENTS

| | | |
|---|---|---|
| 52-16743 | 2/1977 | Japan . |
| 53-54339 | 5/1978 | Japan . |
| 54-28050 | 3/1979 | Japan . |
| 57-92674 | 6/1982 | Japan . |
| 57-147915 | 9/1982 | Japan . |
| 59-229157 | 12/1984 | Japan . |
| 60-51027 | 11/1985 | Japan . |
| 62-238959 | 10/1987 | Japan . |

*Primary Examiner*—Harry B. Tanner
*Attorney, Agent, or Firm*—Foley & Lardner

[57] ABSTRACT

An air conditioning system capable of detecting the amount of residual coolant flowing through circulation piping (1) correctly free of adverse effects of coolant flows. To this end, the air conditioning system is provided with a residual coolant sensor which is constituted by a metal housing (19), an electrode rod (24) provided within the housing (19), and a self-heated thermistor (21) mounted on a fore end portion of the housing (19) and having the opposite ends thereof connected to the electrode rod (24) and housing (19), respectively. The self-heated thermistor 21 is arranged to detect the temperature of the coolant through the housing (19) without directly contacting the coolant to prevent overcooling, and therefore can detect the amount of residual coolant correctly.

2 Claims, 4 Drawing Sheets

RESIDUAL COOLANT SENSOR FOR AIR CONDITIONING SYSTEM

BACKGROUND OF THE INVENTION

1. Field of the Art

This invention relates to an air conditioning system for cooling or heating a room in a vehicle, house or the like, and more particularly to an air conditioning system which is capable of correctly detecting the amount of residual coolant.

2. Technical Background

The air conditioners are generally arranged in the manner as shown in FIG. 6. In this particular example of the prior art, the air conditioning system is shown as being mounted on a vehicle.

In FIG. 6, the reference 1 denotes the piping which defines circulation passages for a coolant such as ammonia gas, flon gas or the like. Successively provided along the length of the piping 1 in the direction of circulation of the coolant (in the direction of arrow A) are a compressor 2, a heat radiator 3, a coolant storage tank 4, an expansion valve 5 and a heat absorber 6. The compressor 2, heat radiator 3, coolant storage tank 4 and expansion valve 5 are located in an engine room (not shown), while the heat absorber 6 is located in a passenger's room (not shown).

With the above arrangement, the coolant which is compressed in gas phase at the compressor 2 turns into liquid phase by releasing heat at the heat radiator 3. The coolant is then circulated to the expansion valve 5 through the coolant storage tank 4 to undergo pressure reduction, and turned into gas phase by heat absorption at the heat absorber 6 before flowing into the compressor 2. As a result of a series of these actions, the coolant cools the passenger room of the vehicle by absorbing heat at the heat absorber 6 and releasing heat to the outside of the vehicle at the heat radiator 3.

On the other hand, in many cases the coolant which is sealed in the system escapes to the outside during use over a long period of time, inviting such reductions in the amount of residual coolant as will deteriorate the functions of the air conditioning system to a material degree.

Therefore, it becomes necessary to check the amount of residual coolant and, for this purpose, there have thus far been introduced various measures including a checkup window provided in an upper end portion of the coolant storage tank and a pressure sensor provided in a liquid phase region upstream of the expansion valve 5 to detect variations in pressure resulting from decreases of the coolant in the system. In case of the pressure sensor, an alert device which is provided in the passenger's room of a vehicle is actuated by a signal from the pressure sensor upon detection of a deficiency of residual coolant, in order to notify the driver of the deficiency.

In case a checkup window alone is provided as a residual coolant sensor means in the above-mentioned prior art, it is necessary to inspect the condition of the residual coolant periodically through the checkup window despite the troublesomeness of the inspection job.

Further, in case of the pressure sensor, there arises a problem of inferior accuracy in detecting the amount of residual coolant because the pressure sensor is located in a liquid phase region which is pressurized by the compressor 2, so that there occur no great changes in pressure from the liquid to gas phase.

With the foregoing problems in view, the present inventor conceived of detecting the amount of residual coolant by the use of a self-heated type thermistor, conducted research including measurement of variations in the resistance of a self-heated type thermistor inserted in the piping which defines flow passages for the coolant.

However, in this instance the self-heated type thermistor is held in direct contact with the coolant, so that it is likely to be cooled to an excessive degree depending upon the coolant flows. Besides, the flow velocity of the coolant is increased in the gas phase by reduced flow resistance and its cooling effect becomes higher in proportion to the increased flow velocity, and consequently the resistance which is proportional to the temperature variation does not change greatly from liquid phase to gas phase.

In view of the foregoing unsolved problems, it is an object of the present invention to provide an air conditioning system which is capable of correctly detecting leaks and deficiency of the coolant in a simplified manner.

SUMMARY OF THE INVENTION

As a solution to the above-mentioned problems, the present invention employs an arrangement, including: a piping system for circulating a coolant, the piping system being provided with, successively along the course thereof and in the direction of circulation of the coolant, a compressor, a heat radiator, a coolant storage tank, an expansion valve and a heat absorber; and a residual coolant sensor provided in a liquid phase region between the heat radiator and the heat absorber to detect the amount of residual coolant in a flow passage in the liquid phase region, the residual coolant sensor including a housing of a metallic material fixed in a flow passage in the liquid phase region, an electrode provided in an electrically insulated state within the housing and arranged to be applied with a voltage from outside, and a self-heated temperature-sensitive resistor element located in a fore end portion of the housing and having one end thereof connected to the electrode and the other end to the housing to detect the temperature of the coolant through the housing.

The residual coolant sensor may be provided within the coolant storage tank if desired.

With the above-described arrangement, the self-heated temperature-sensitive resistor element can detect the temperature of the coolant through the housing without directly contacting the coolant itself, so that it becomes possible to detect the amount of residual coolant correctly while securely preventing the problem of overcooling as caused by coolant flows.

Further, the arrangement having the residual coolant sensor provided in the coolant storage tank can also detect the amount of residual coolant correctly and facilitate the installation of the sensor.

BRIEF DESCRIPTION OF THE DRAWINGS

FIGS. 1 through 5 concern an embodiment of the present invention, of which FIG. 1 is a plan view of a coolant storage tank, FIG. 2 is a side view of the coolant storage tank of FIG. 1, FIG. 3 is a vertical sectional view of the coolant storage tank, FIG. 4 is a vertical sectional view of a residual coolant sensor, FIG. 5 is a characteristics diagram of a self-heated thermistor.

BEST MODE FOR PRACTICING THE INVENTION

Figure 1:
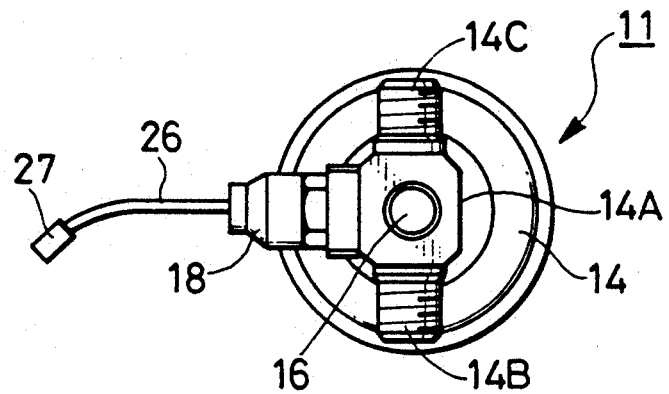
Figure 2:
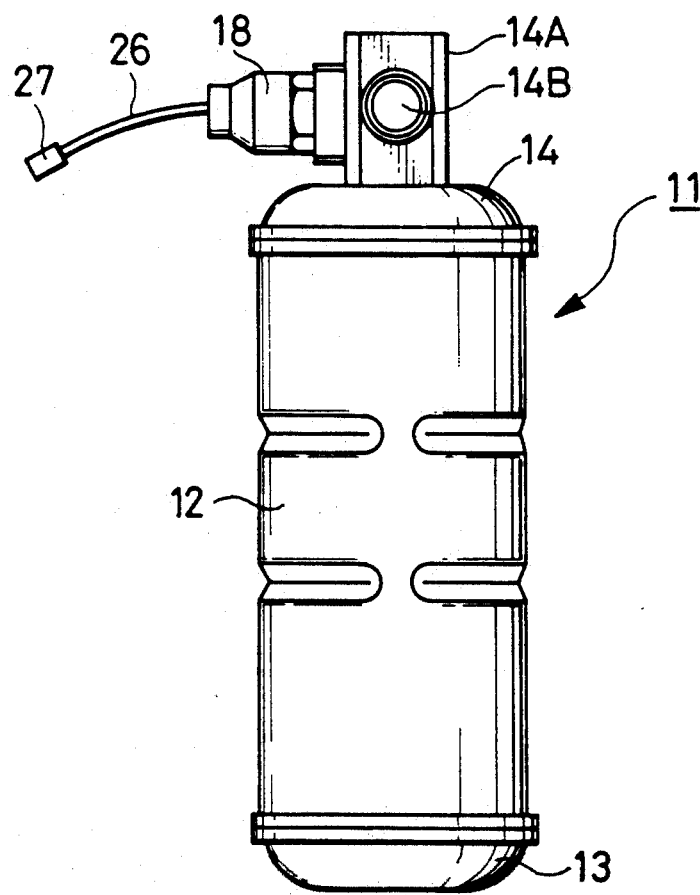
Figure 3:
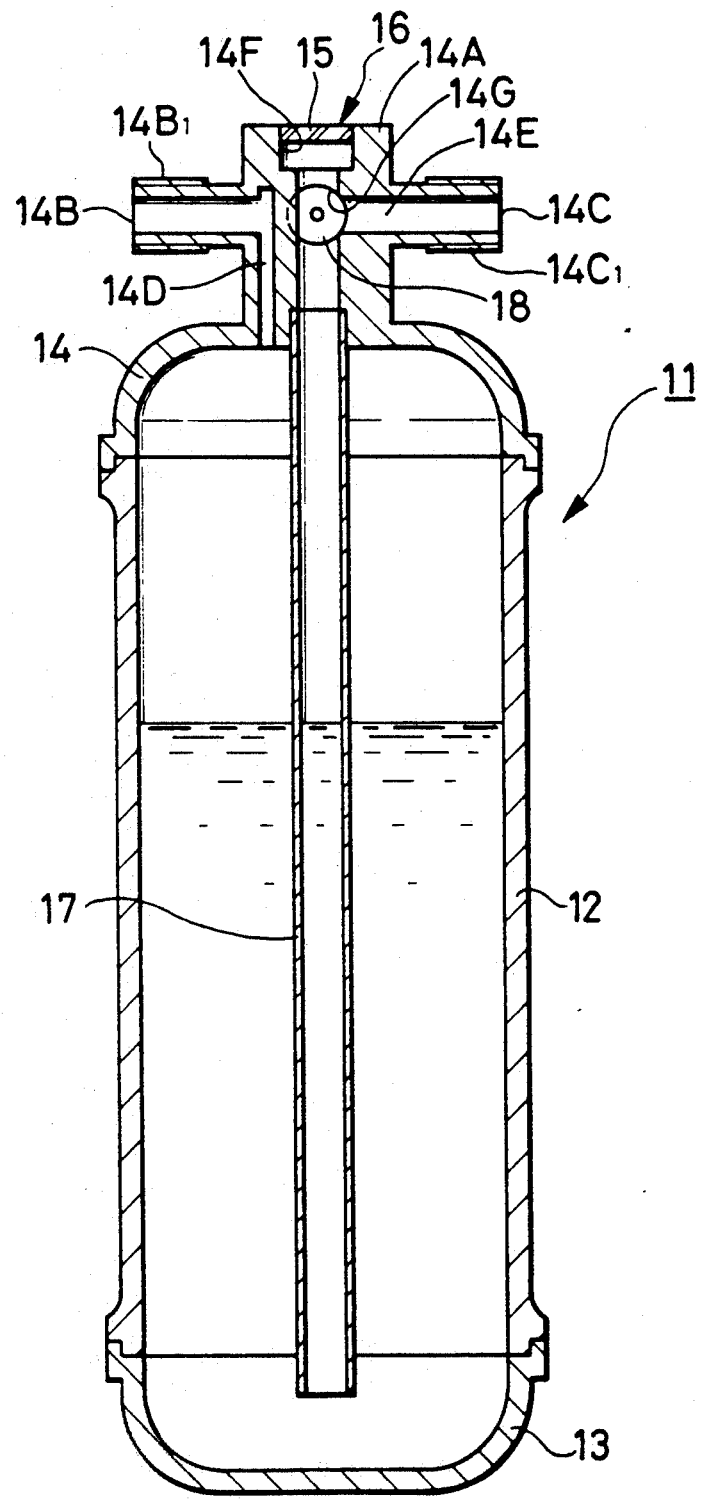

Hereafter, an embodiment of the present invention is described with reference to FIGS. 1 through 5. In this embodiment, by way of example, the invention is also applied as a vehicular air conditioning system. The general arrangement of the air conditioning system is the same as the above-described conventional counterpart, and therefore common component parts are designated by common reference numerals or characters to avoid repetitions.

In these figures, the reference numeral 11 denotes a coolant storage tank which is provided in the piping 1 between a heat radiator 3 and an expansion valve 5, in the same manner as in the prior art counterpart. This coolant storage tank 11 is primarily constituted by a cylindrical member 12, a bottom lid 13 closing the bottom of the cylindrical member 12, and an upper lid 14 closing the top end of the cylindrical member 12.

On the other hand, the upper lid 14 is integrally provided with a pipe joint portion 14A, providing an inlet pipe joint 14B and an outlet pipe joint 14C having male screws 14B and 14C formed around the respective outer peripheries. The inlet pipe joint 14B is in communication with the inside of the tank 11 through an entrance passage 14D, while the outlet pipe joint 14C is in communication with an exit passage 14E of L-shape. Further, the exit passage 14E is provided with a bulged large-diameter portion 14F at the upper end of its vertical portion in FIG. 3. Sight glass 15 is fitted in the bulged portion 14F to provide a checkup window 16. A suction pipe 17 is connected to the lower end of the outlet passage 14E to suck in the coolant at the bottom of the tank 11 and feed it to the downstream side of the piping 1 through the outlet pipe joint 14C. The piping joint 14A is provided with a sensor mounting hole 14G which is bored in such a manner as to communicate the exit passage 14E with the outside and is provided with a female screw on the inner periphery thereof.

Figure 4:
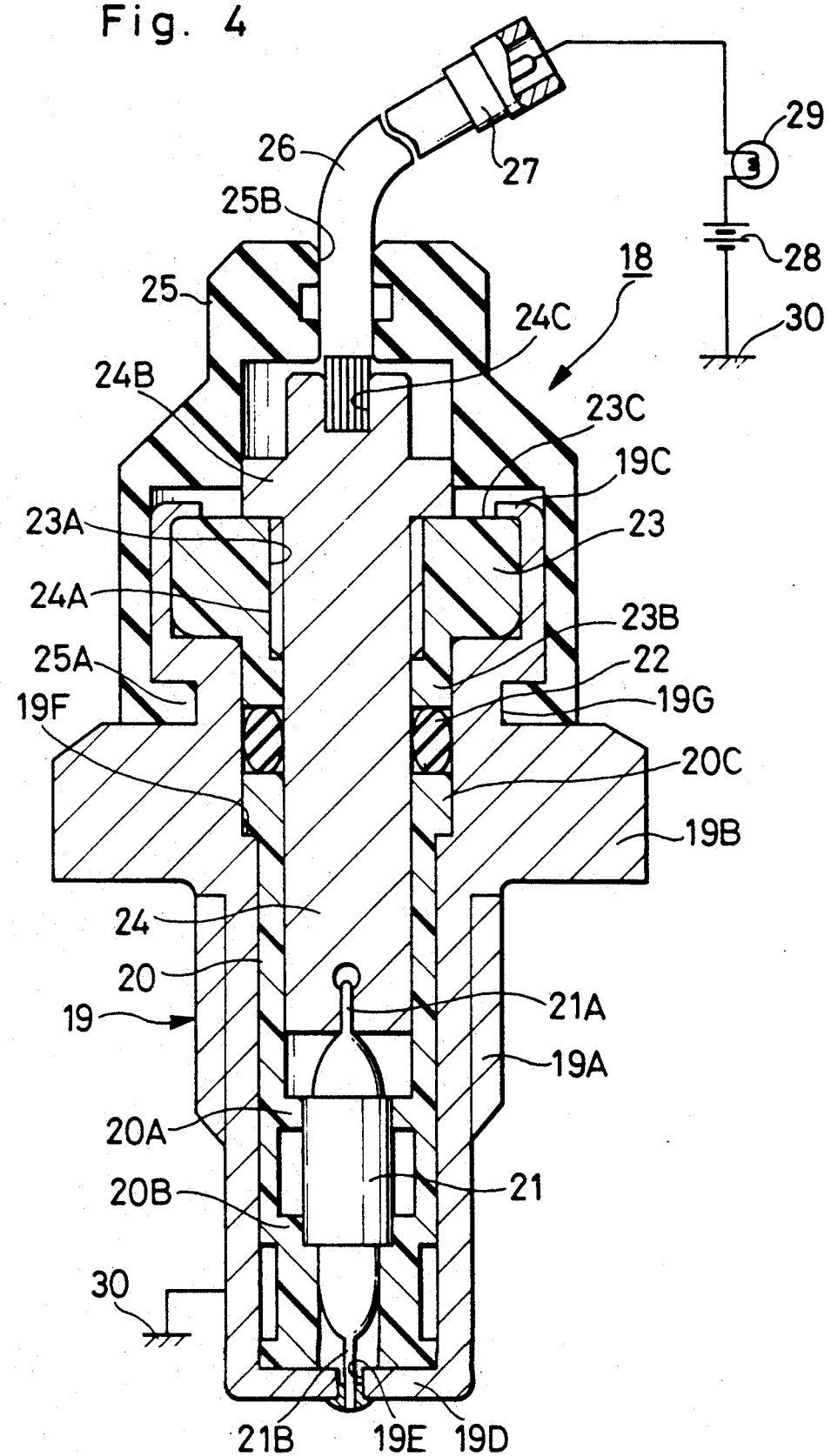

Indicated at 18 is a residual coolant sensor which is fitted in the pipe joint 14A of the coolant storage tank 11 in the liquid phase region to detect the residual amount of coolant. The residual coolant sensor 18 is arranged as shown in FIG. 4. More specifically, the sensor 18 is provided with a housing 19 which is threaded into the sensor mounting hole 14G. The housing 19 is formed in a bottomed cylindrical shape, for example, from brass, and provided with a male screw portion 19A on the outer periphery thereof for threaded engagement with the female screw portion on the part of the sensor mounting hole 14G. A bolt head 19B is formed at the proximal end (at the upper end in the drawing) of the male screw portion 19A. A caulking portion 19C is provided at the proximal end of the bolt head 19B to support an electrode rod holder 23 in a caulked state as will be described hereinafter. Further, a terminal receptacle hole 19E is provided in a bottom wall portion 19D at the fore end of the housing 19 to insert a terminal 19D of a self-heated thermistor 21 which will be described later. When the housing 19 is threaded into position in the sensor mounting hole 14G, its fore end portion is extended into the outlet, passage 14E, forming an electrode which is grounded through the coolant storage tank 11.

Designated at 20 is a sensor holder which is inserted in the housing 19, the sensor holder 20 being formed substantially in a cylindrical shape, for example, from a phenolic resin and provided with reduced diameter portions 20A and 20B in its fore end portions thereby to support the self-heated thermistor 21, which will be described later, at two vertically spaced positions. The sensor holder 20 is formed with a flange portion 20C in its proximal end portion for abutting engagement with a stepped wall portion 19F which is formed on the inner periphery of the housing 19.

The self-heated thermistor, which is indicated at 21, is located in a fore end portion of the housing 19 to serve as a self-heated temperature-sensitive resistance element, the self-heated thermistor 21 being supported in the reduced diameter portions 20A and 20B of the sensor holder 20 and having its terminal 21A on the positive side connected to a pull-out electrode rod 24, which will be described later, and its terminal 21B on the negative side inserted and soldered from outside in the terminal receptacle hole 19E of the housing 19 on the side of the ground.

Indicated at 22 is an O-ring, for example, of nitrile rubber, which is provided in the housing 19 in abutting engagement with the flange portion 20C at the base end of the sensor holder 20 and pressed thereagainst by an annular projection 23B of an electrode rod holder 23, which will be described later, thereby forming a seal to prevent leaks of the coolant.

The electrode rod holder 23, which is fitted in the caulking portion 19C of the housing 19, is formed substantially in the shape of a thick-walled cylinder, for example, from a phenolic resin, and provided with a female screw portion 23A on the inner periphery thereof, along with the annular projection 23B which is formed at its fore end and fitted in the housing 19 to press the 0-ring 22.

The pull-out electrode rod 24, which is inserted in the electrode rod holder 23 and sensor holder 20, is an electrode body constituting a positive electrode of the self-heated thermistor 21, and formed substantially in a cylindrical shape, for example, from copper phosphate. The pull-out electrode rod 24 is formed with a male screw portion 24A in its proximal end portion for threaded engagement with the female screw portion 23A of the electrode holder 23. A flange portion 24B, which is provided at the proximal end of the male screw portion 24A, is abutted against the proximal end 23C of the electrode holder 23 to hold the electrode 24 in position. Further, the electrode rod 24 is provided with a connecting recess 24C to be coupled with a harness 26 which will be described later.

The reference 25 indicates a rubber boot which covers the caulking portion 19C at the proximal end of the housing 19 and the electrode rod 24. The boot 25 is provided with a stopper portion 25A at its fore end for engagement in a reduced diameter portion 19G between the bolt head 19B and the caulking portion 19C of the housing 19. A hole 25B is provided at the proximal end of the boot 25 to insert the harness 26 as described hereinafter.

Designated at 26 is the harness which is coupled at one end thereof with the connecting recess 24C of the pull-out electrode 24 through the hole 25B of the boot 25 and provided with a connector 27 at the other end which is connected in series with a power source 28 for power application to the self-heated thermistor 21 and an alarm device 29, forming as a whole a loop which consists of the power source 28, alarm device 29, self-heated thermistor 21 and ground 30. In this instance, the alarm device 29 is located within the passenger's room of the vehicle, and actuated by a change in resistance value of the self-heated thermistor 21 to give the driver a signal of a deficiency of the residual coolant by way of a lamp, buzzer or other suitable means.

Figure 5:
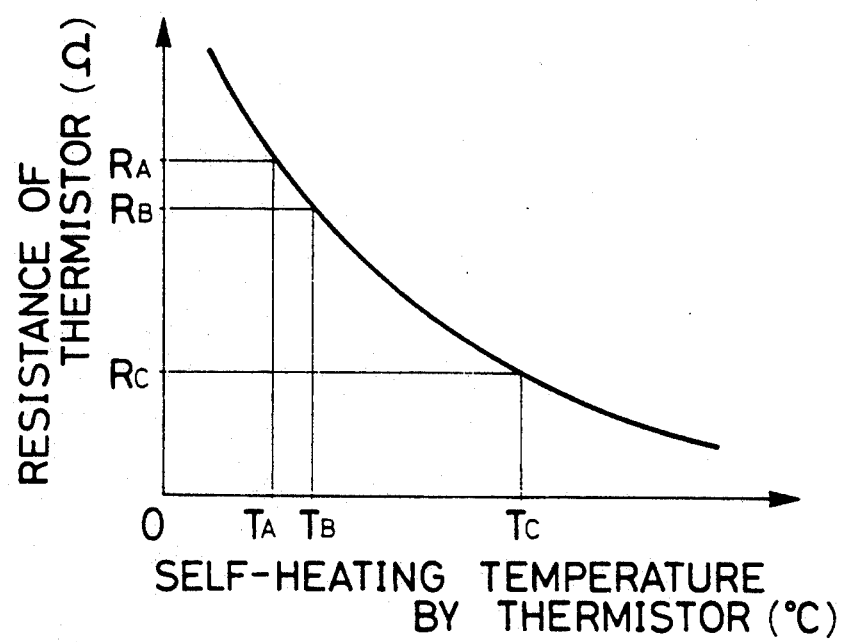
Figure 6:
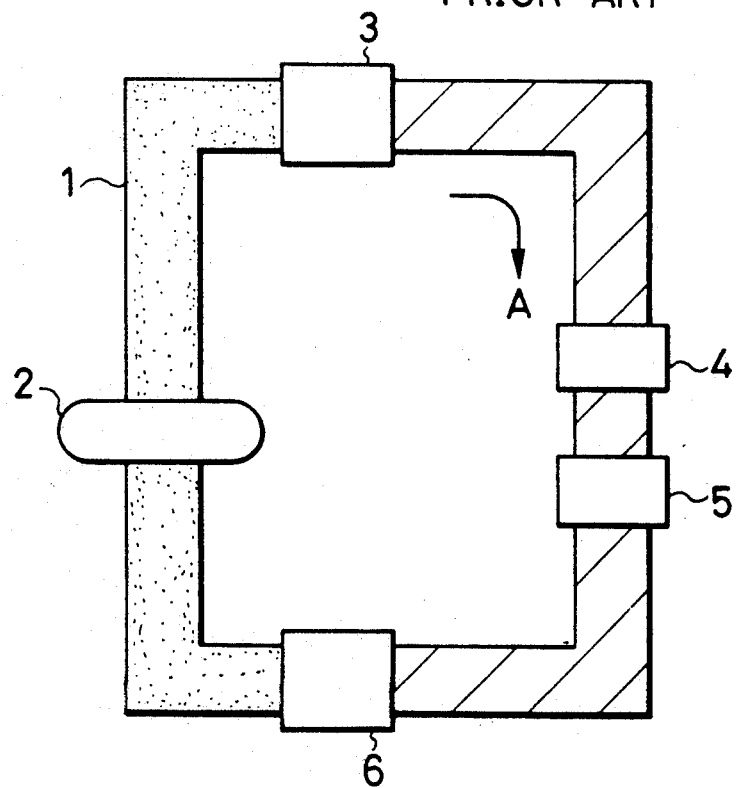
FIG. 6 is a diagrammatic illustration of the general arrangement of a prior art air cooling system.

On the other hand, the self-heated thermistor 21 generally has characteristics as shown in FIG. 5. Namely, its resistance is high when the temperature of the thermistor 21 itself is low, and its resistance becomes lower as its temperature rises. Further, when the coolant in indirect contact with the thermistor 21 through the housing 19 is in liquid phase, the heat absorption by the coolant is greater than the calorific value of self-heating by the thermistor 21, and therefore the thermistor 21 is cooled almost to the same level as the coolant. In case the amount of residual coolant drops to a deficient level due to leaks of the coolant or other reasons to create a mixed state of gas- and liquid-phases (a gas-liquid mixed state), the heat absorption by the coolant becomes smaller than the calorific value of self-heating of the thermistor 21, and as a consequence heat is built up in the housing 19 to elevate the temperature of the thermistor 21 to a considerable degree.

Since the air conditioning system of the foregoing arrangement is the same as the above-described prior art counterpart in general operations of the system, the description in this regard is omitted here to avoid repetition.

On the other hand, at the coolant storage tank 11, the coolant, which has been compressed by the compressor 2 and turned into liquid phase by releasing heat at the radiator 3, flows into the tank 11 from the inlet pipe joint portion 14B through the entrance passage 14D, while the coolant stored within the tank 11 flows out to the downstream side of the piping 1 through the suction pipe 17, exit passage 14E and outlet joint portion 14C.

The coolant flowing through the exit passage 14E comes into contact with the residual coolant sensor 18 which is located to extend into the exit passage 14E, thereby cooling the sensor 18. At this time, the housing 19 of brass is directly cooled by the coolant, while the self-heated thermistor 21 is indirectly cooled through the housing 19 and the sensor holder 20.

When the amount of residual coolant is sufficient, the coolant of liquid phase flows in contact with the housing 19, indirectly cooling the self-heated thermistor 21 and absorbing almost all of the generated heat of the thermistor 21 to maintain the thermistor at substantially the same temperature level as the coolant. As a result, the thermistor 21 is held, for example, at the temperature $T_A$ of FIG. 5 where it has a resistance value $R_A$.

On the other hand, in a case where the thermistor is mounted in an exposed state to coolant flows, if the amount of residual coolant drops to a deficient level to create a state of mixed gas- and liquid-phases, the self-heated thermistor is directly and quickly cooled by the coolant flows (flow velocity). Therefore, the thermistor is held, for example, at the temperature $T_B$ of FIG. 5 where it has a resistance value $R_B$, with only a small variation from the resistance value $R_A$ in the liquid phase.

In contrast, in the case of the self-heated thermistor 21 of the present embodiment of the invention, the calorific value of self-heating of the thermistor 21 is higher than the heat absorption by the coolant, so that heat is built up within the housing 19. As a consequence, the temperature of the self-heated thermistor 21 rises gradually, for example, to the level $T_C$ of FIG. 5 to have a resistance value $R_C$ which is markedly varied from the resistance value $R_A$ in the liquid phase.

Thus, as long as the amount of residual coolant is sufficient and the liquid-phase coolant is in contact with the housing 19, the thermistor 21 is at a low temperature and has a high resistance value, holding the voltage across the alarm device 29 at a low level which has no possibilities of actuating the alarm device 29.

On the other hand, when, because of a deficiency of residual coolant, the temperature of the self-heated thermistor 21 is elevated by the above-described actions to have a minimized resistance value, the voltage across the alarm device 29 rises to a level at which the alarm 29 is actuated to give a signal of coolant deficiency to the driver.

Consequently, it becomes possible to detect correctly whether the coolant is perfectly in liquid phase or in a gas-liquid mixed state or in gas phase, detecting a deficient state of the coolant in a reliable manner and with high detection accuracy.

Further, the accurate detection of the deficiency of residual coolant makes it possible to spot the deficiency in an early stage to prevent seizure or other troubles of the compressor 2.

Although the residual coolant sensor 18 is provided in the pipe joint 14A of the coolant storage tank 11 in the present embodiment, the sensor is not restricted to that location and may be provided in other liquid phase regions of the piping 1 between the heat radiator 3 and the expansion valve 5 to achieve similar operations and effects as in this embodiment.

The self-heated thermistor 21, which is employed as a self-heated temperature-sensitive resistance element, may be replaced by a self-heated posistor or other self-heated temperature-sensitive resistance elements if desired.

Further, although the air conditioning system of the invention has been shown by way of a cooling system in the present embodiment, it is to be understood that the system of the invention can produce similar operational effects as a heating system.

Moreover, a stagnant flow portion may be provided around the residual coolant sensor 18 in the exit passage 14E to preclude the adverse effects of the coolant flows on the sensor.

POSSIBILITIES OF INDUSTRIAL APPLICATION

As clear from the foregoing detailed description, the air conditioning system of the invention is provided with a residual coolant sensor which is constituted by a housing located in a flow passage in a liquid phase region, an electrode provided within the housing and arranged to be applied with a voltage from outside, and a self-heated temperature-sensitive resistance element located in a fore end portion of the housing and connected at one end to the electrode and at the other end to the housing and adapted to detect the temperature of a coolant through the housing. Since the self-heated temperature-sensitive resistance element is arranged to detect the temperature of coolant indirectly through the housing, the calorific value of self-heating of the resistance element becomes greater than the heat absorption by the coolant when a mixed gas-liquid condition is created due to deficiency of the coolant, thereby elevating the temperature of the resistance element to such a marked degree as to correctly distinguish a state of perfect liquid phase from a mixed state of liquid and gas phases or a state of gas phase, thereby permitting the detection of a deficiency of coolant correctly with enhanced detection accuracy.

What is claimed is:

1. An air conditioning system, comprising: a piping system for circulating a coolant, said piping system being provided with, successively along the course thereof and in the direction of circulation of said coolant, a compressor, a heat radiator, a coolant storage tank, an expansion valve and a heat absorber; and a residual coolant sensor provided in a liquid phase region of said piping between said heat radiator and said heat absorber to detect the amount of residual coolant in a flow passage in said liquid phase region, said residual coolant sensor including a housing of a metallic material fixed in a coolant flow passage in said liquid phase region, an electrode provided in an electrically insulated state within said housing through a first insulating holder member and arranged to be applied with a voltage from outside and a self-heated temperature-sensitive resistor element located in a fore end portion of said housing in an electrically insulated state through a second insulating holder member and having one end thereof connected to said electrode and the other end to said housing to detect the temperature of said coolant through said housing and said second insulating holder member.

2. An air conditioning system as defined in claim 1, wherein said residual coolant sensor is provided in said coolant storage tank.

* * * * *